Figure 1:
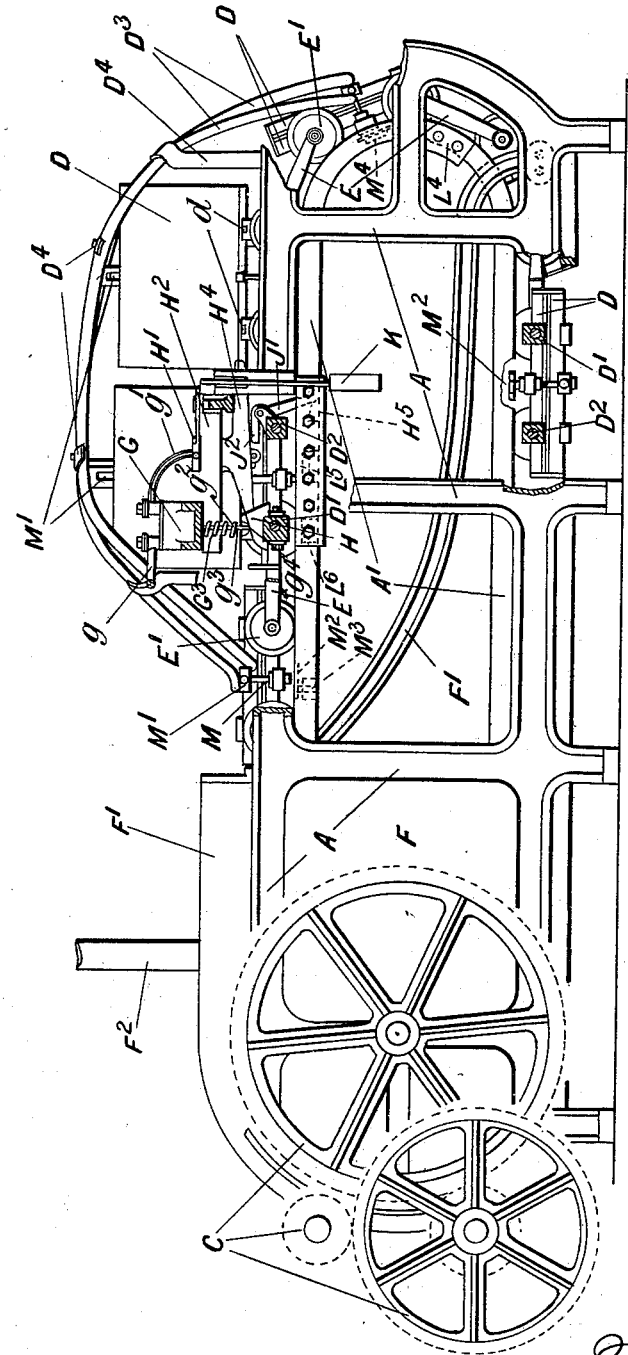

No. 661,729. Patented Nov. 13, 1900.
G. S. BAKER.
APPARATUS FOR MANUFACTURING SUGAR WAFERS OR THE LIKE.
(Application filed Mar. 21, 1899.)
(No Model.) 6 Sheets—Sheet 1.

No. 661,729. Patented Nov. 13, 1900.
G. S. BAKER.
APPARATUS FOR MANUFACTURING SUGAR WAFERS OR THE LIKE.
(Application filed Mar. 21, 1899.)
(No Model.)
6 Sheets—Sheet 2.

No. 661,729. Patented Nov. 13, 1900.
G. S. BAKER.
APPARATUS FOR MANUFACTURING SUGAR WAFERS OR THE LIKE.
(Application filed Mar. 21, 1899.)
(No Model.) 6 Sheets—Sheet 3.

No. 661,729. Patented Nov. 13, 1900.
G. S. BAKER.
APPARATUS FOR MANUFACTURING SUGAR WAFERS OR THE LIKE.
(Application filed Mar. 21, 1899.)
(No Model.) 6 Sheets—Sheet 4.
Fig. 5.
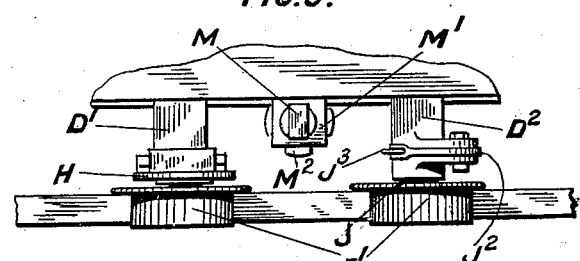
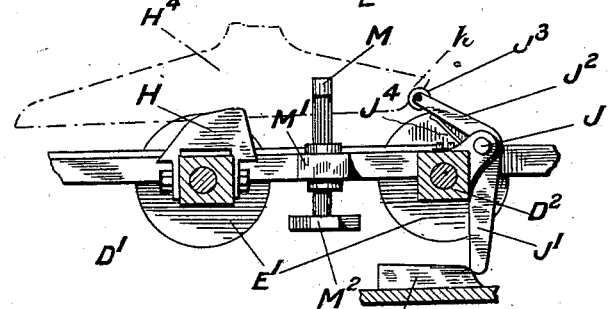
Fig. 4.

No. 661,729. Patented Nov. 13, 1900.
G. S. BAKER.
APPARATUS FOR MANUFACTURING SUGAR WAFERS OR THE LIKE.
(Application filed Mar. 21, 1899.)
(No Model.) 6 Sheets—Sheet 5.
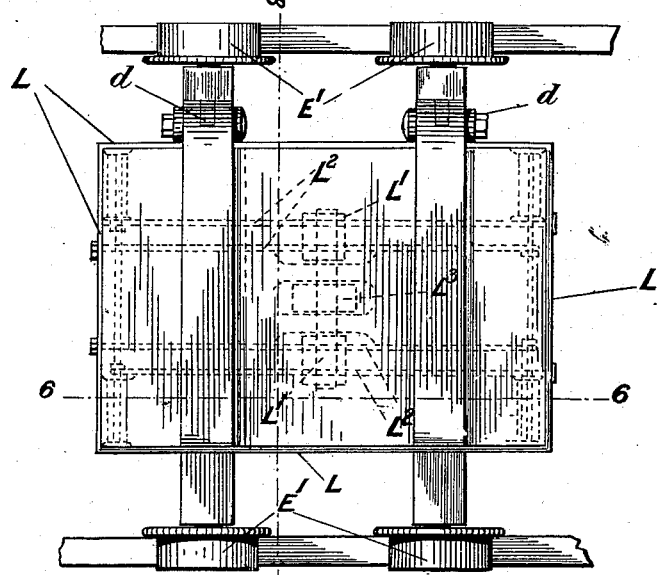
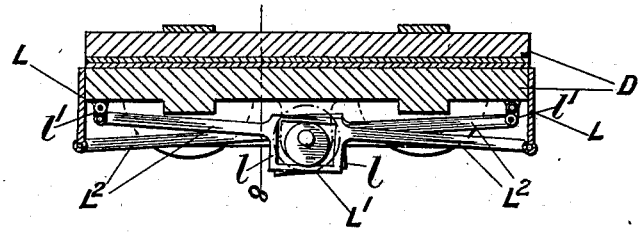
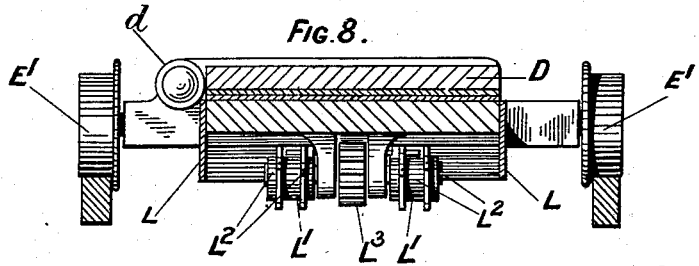

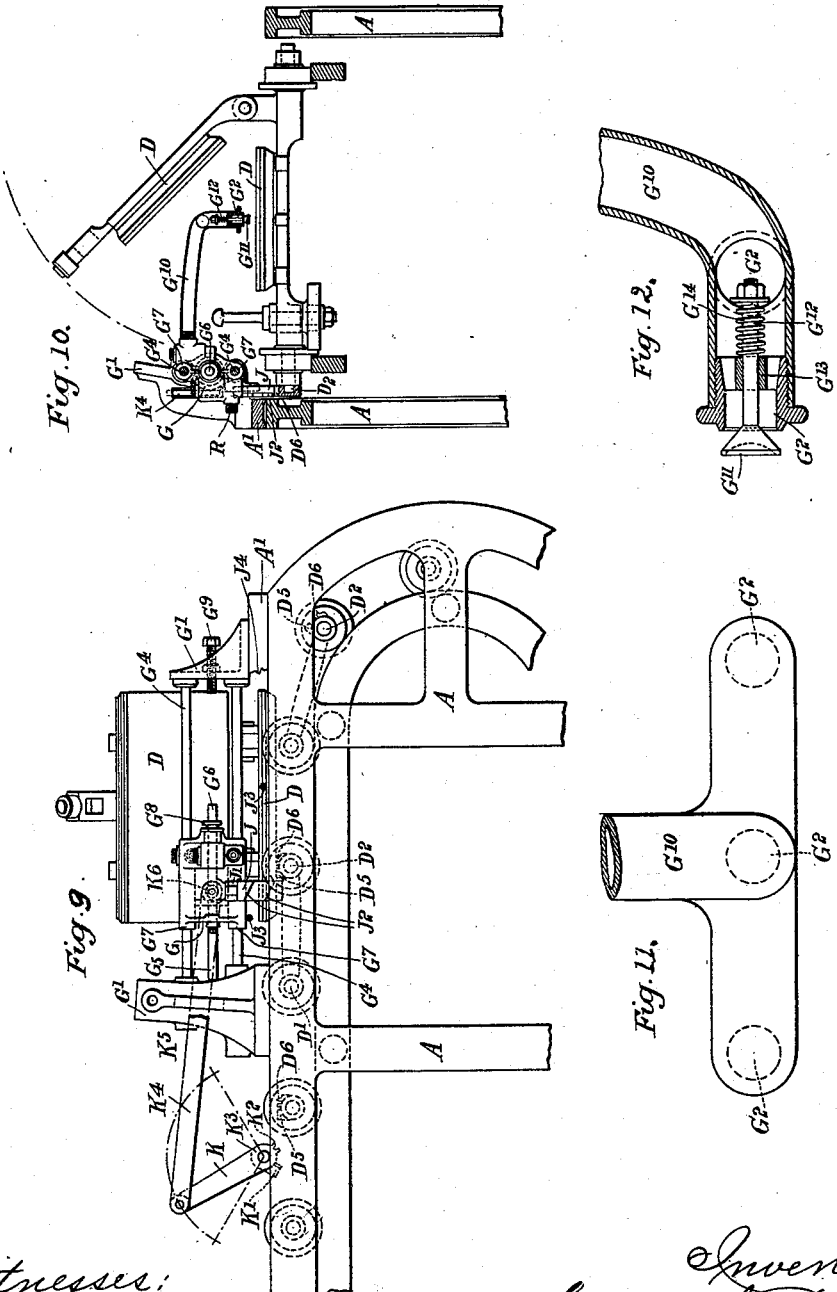

UNITED STATES PATENT OFFICE.

GEORGE SAMUEL BAKER, OF LONDON, ENGLAND.

APPARATUS FOR MANUFACTURING SUGAR-WAFERS OR THE LIKE.

SPECIFICATION forming part of Letters Patent No. 661,729, dated November 13, 1900.

Application filed March 21, 1899. Serial No. 709,947. (No model.)

*To all whom it may concern:*

Be it known that I, GEORGE SAMUEL BAKER, a subject of the Queen of England, residing at London, England, have invented certain new and useful Improvements in Apparatus for the Manufacture of Sugar-Wafers or the Like, (for which I have made application in Great Britain under No. 20,043, dated September 20, 1898,) of which the following is a specification.

This invention relates to apparatus for the manufacture of sugar-wafers and similar confections in which an endless chain carrying a series of pairs of plates or "tongs" upon which the wafers are baked is mechanically fed through a gas-oven or other heater or in which the plates of a series radial to a central spindle around which they travel are individually rotatable about their own axes. The object of the present invention is to make such machines more automatic and to enable them to operate with a much smaller waste or scrap of batter than in such machines as hitherto usually constructed.

According to this invention an automatic filler or feeding device is provided for the plates and also an automatic cutting-off device for getting rid of the fringe of baked batter which hangs from the meeting edges of each pair of plates. The cutting-off device may comprise knives provided on all the sides of one plate in each pair and capable of being operated at the desired intervals by a cam or other mechanism controlled by some projection on the frame relatively to which the chain or series of plates has motion. These knives, or strips employed in place of the knives, may be operated in passing a stationary projection to form a bead or edging for each plate while the fresh batter is being delivered onto it and immediately thereafter, so as to enable the batter to level itself upon the plate, filling the corners, and being kept from flowing freely over the edges and subsequently producing waste or scrap. As an alternative to these movable raised edges one of each pair of plates may have a permanent bead or edging of such height that no clearance, or only a very small clearance, remains between each pair of plates when they are brought together instead of the excessive clearance which has been provided heretofore. A convenient construction of automatic filler or feeding device according to this invention is a pump communicating with a batter-supply reservoir and having a piston operated at the desired intervals by a cam or otherwise in such a manner that the requisite quantity of batter is forced from the pump through a feed-nozzle onto the surface of a plate beneath the latter. The cam may be arranged to so operate the piston that the speed at which the batter is delivered on certain portions of the plate may be varied. The device above referred to for discharging the batter onto the plate should not begin the delivery of batter too soon or complete its delivery until just before the plates of each pair are closed or brought face to face. The delivery device may be connected with the cylinder whence it derives its supply by flexible connections and be arranged to be caught by the traveling plate and moved along in company with it against the action of a spring or other quick-return device. The batter may be delivered not only during the movement of the delivery device in company with the traveling plate, but also while it moves rearwardly over the plate to its normal position of rest or during such rearward movement alone.

Figure 2:
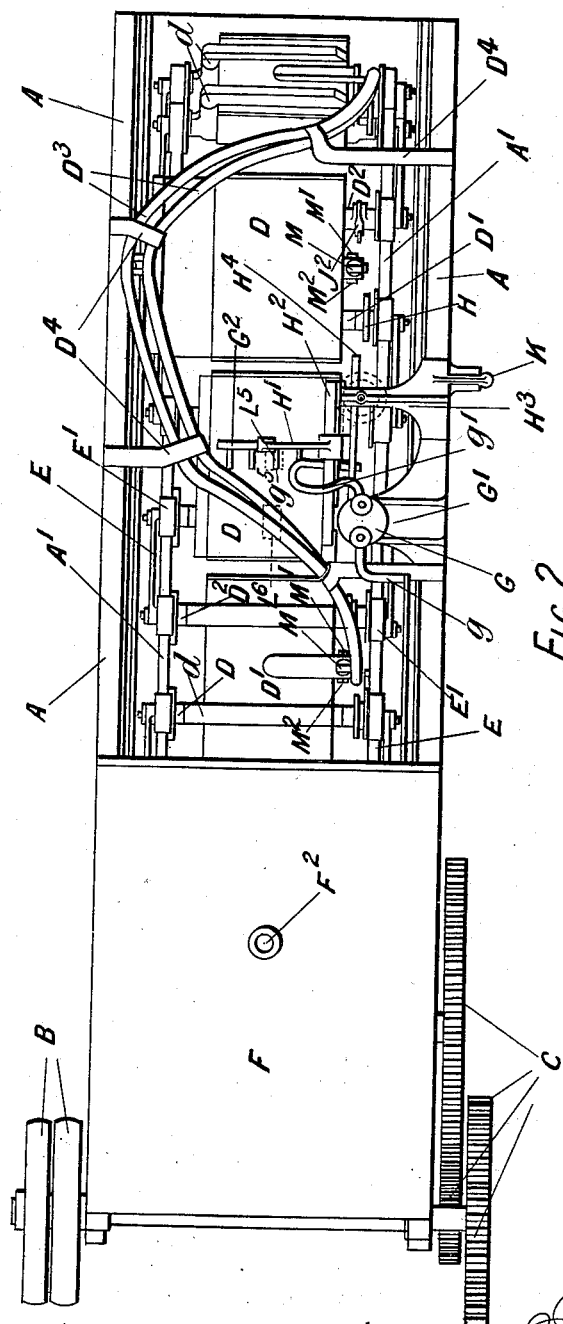
Figure 3:
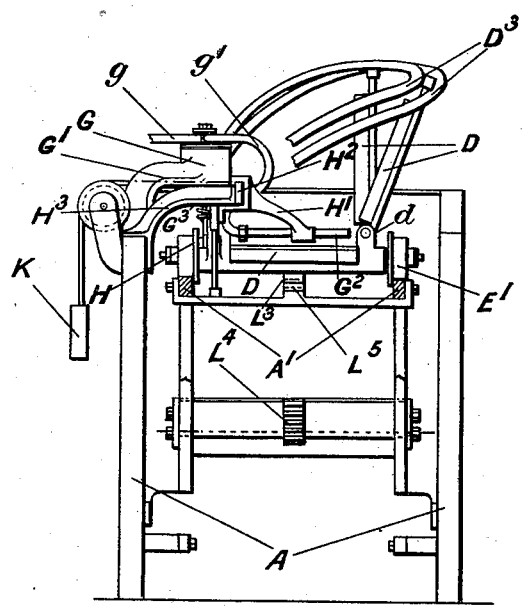

In the accompanying drawings, which illustrate one method of constructing a machine according to this invention, Figure 1 is a side elevation of a complete machine. Fig. 2 is a plan of the same. Fig. 3 is an end elevation of the same. Figs. 4 and 5 show in elevation and plan, respectively, details of the automatic feed device. Figs. 6 and 7 are detail views in elevation and plan, respectively, of the automatic trimming device. Fig. 8 is a vertical section on the line 8 8 of Fig. 7. Fig. 9 is a side elevation of the alternative construction of batter-delivering device. Fig. 10 is an end elevation of the same. Fig. 11 is a plan of a triple-delivery nozzle forming part of such device, and Fig. 12 is a section through one of the nozzles.

Like letters indicate like parts throughout the accompanying drawings.

Referring first to Figs. 1 to 3, the main frame A of the machine has mounted upon it at one end the driving mechanism, comprising fast and loose pulleys B, operatively connected with a train of gear-wheels C. Tongs or plates D, comprising each a lower plate having hinged to it a lid or upper plate, are connected by links E, so that they form a chain which is made to travel around a frame A' by means of the driving mechanism B C. To enable the chain to travel freely over the frame A', flanged wheels E' are provided at the ends of axles D' D². The axles D' D² carry the tongs D and also the connecting-links E, so that the whole weight of the chain falls upon the flanged wheels E', which as the chain travels roll upon the frame A'. The chain carries the tongs D through an oven F, heated by gas or other means and having a top plate F' and flue F². Guide-rods D³ D³, carried by supports D⁴, engage the lids or upper plates of the traveling tongs D as they approach in such a manner that the lids are raised upon their hinges d and again lowered while their corresponding lower plates pass under the guide-rods. Before the lid is again lowered the bottom plate of the tongs D is automatically charged with batter. To effect this operation, a cylinder G is mounted on a bracket G', supported by the frame A, and communicates with a batter-supply reservoir (not shown in the drawings) by a pipe g and with a feed-nozzle G² by a pipe g'. A piston having a rod G³ is mounted within the cylinder G and is normally held at the bottom of the same by a spring g², which bears at one end against a collar g³ on the piston-rod and at the other against the head of the cylinder G. On the axle D' of each pair of tongs D is mounted a cam H, Figs. 1 to 5, which as it is carried forward by the traveling tongs D is brought into contact with the end of the piston-rod G³. The end of the piston-rod G³ is furnished with a friction-roller g⁴, so that it is freely raised by the approaching cam and by means of its piston forces a quantity of batter through the pipe g' and feed-nozzle G² onto the lower plate of the tongs D. The feed-nozzle G² comprises a main pipe attached at one end to the feed-pipe g' and closed at the other. This main pipe is supported so as to project over the lower plate of the traveling tongs D by a carrier or bracket H', Fig. 3, and is provided with a number of small nozzles g⁵, by which the batter makes its exit onto the plate of the tongs. The carrier or bracket H' may be either fixed to the main frame A, so that the feed-nozzle G² is held stationary while it delivers the batter onto the traveling plates, or it may be made to travel with each plate while delivering batter and may also be returned in the opposite direction to that of the travel of the plates during the time of delivery by means of any convenient quick-return device. In the latter cases the connection g' between the cylinder G and the feed-nozzle G² is made of flexible pipe or tube, and the bracket H' is carried by a guide H², upon which it is free to slide in a line parallel to that traversed by the tongs D. The guide H² is secured at one end to the face of the cylinder G, and at the other is supported by a bracket H³, secured to the frame A.

On the axle D² of each of the pairs of tongs D is mounted a bell-crank lever forming part of the gear employed in moving the feed-nozzle, as hereinafter explained. It is pivoted at J (see Figs. 4 and 5) and has arms J' J². The end of the arm J² is provided with a friction-roller J³, and a spring J⁴ keeps the arm normally raised, the arm J' acting against the axle D² as a stop, Fig. 4.

The carrier or bracket H' carries an inclined cam-plate H⁴, provided at one end with a recess h, Fig. 4, and below and forward of the inclined cam-plate H⁴ is a second inclined cam H⁵, fixed to any convenient part of the frame A A'. The inclined cams H⁴ H⁵ are disposed in the same vertical plane as the series of bell-cranks J' J² and operate with the same, as hereinafter described.

The carrier H', carrying the feed device G² and the inclined cam H⁴, has attached a spring or a weight K, Figs. 1, 2, and 3, which always tends to keep it at one end of the guide-rod H².

The trimming device, Figs. 6 to 8, for each pair of tongs D comprises four blades or knives L, which may be connected together at their corners, as shown in Fig. 7, so that they form one rectangular blade. The blades or knives L normally remain below the joint of the two plates or tongs D, but may be raised and made to pass over the joint at stated intervals by means of the eccentrics L' and operating-rods L². The eccentrics L' are mounted on a shaft carried beneath the lower plate of the tongs D and work within the frames l of the levers L². The levers L² are arranged in pairs, each pair being connected to opposite ends of the rectangular knife-band L, formed by connecting together the separate blades or knives L, as suggested above. A fulcrum is provided for the levers L² by hinging their otherwise free ends to the bottom of the lower plate D by links l'. On the shaft upon which the eccentrics L are carried is a gear-wheel L³, and on the frame A' is fixed a rack L⁴ Figs. 1 and 3. As the tongs D pass over the rack L⁴ the wheel L³ engages with the rack L⁴, which, being provided with the same number of teeth as the wheel L³, imparts one revolution to the same, and the eccentrics L' being carried around with the wheel L³ raise and lower the knives L once. The frame A' is provided with a second rack L⁵, having half the number of teeth carried by rack L⁴, so that as the wheel L³ is carried over it the wheel receives half a revolution. The knives L are thus raised by the eccentrics L' and remain in this position until a third rack L⁶, also carried by the frame A', is passed over, which imparts a second half-revolution to the wheel L³, causing the blades or knives L to be brought back to their normal position.

The upper plates of the tongs D upon being lowered from the guide-rods D³ onto the bottom or lower plates are locked by a catch-piece M, Figs. 1, 2, 4, and 5, which passes through a projection M' in the lid or upper plate and on receiving a quarter of a revolution locks the upper and lower plates D together. The quarter-revolution is imparted to the catch-piece M by a star-wheel $M^2$, attached to the lower end of the same. The star-wheel $M^2$ in passing a pin $M^3$, conveniently mounted on the frame A', is brought into engagement with the same and is thus made to revolve a quarter of a turn. A similar pin $M^4$ unlocks the plates just before the upper plate enters the guide-rods $D^3$.

The operation of the machine is as follows: As the lower plate D approaches a point beneath the feed-nozzle $G^2$ the end of the arm $J^2$ of the bell-crank lever J' $J^2$, with its friction-roller $J^3$, strikes against the recessed end $h$ of the cam $H^4$ and causes the carrier H', to which it is attached, to travel forward on the guide $H^2$ against the action of the weight K. The carrier H' carries with it the feed-nozzle $G^2$, the nozzles $g^5$ of which are kept directly over the forward end of the lower plate of the tongs D. This forward movement of the carrier H' and its attached parts is continued until the arm J' of the bell-crank lever J' $J^2$ strikes against the end of the lower inclined cam $H^5$, when the forward movement being continued the arm $J^2$ is forced down in opposition to the resistance offered by its spring $J^4$ and released from its engagement with the recessed end $h$ of the inclined cam $H^4$. At this movement the cam H on the axle D' of the adjacent tongs commences to operate the piston $G^3$ and to force batter from the cylinder G through the pipe $g'$ and feed-nozzle $G^2$ onto the lower plate of the tongs D. While the batter is being thus delivered, the bracket H', which carries the feed-nozzle $G^2$, is returning to its normal position under the influence of the weight K, its speed of return being regulated by the arm $J^2$ of the bell-crank J' $J^2$, which the inclined cam $H^4$ has to force down as it returns against the action of the spring $J^4$. The inclined cam $H^4$ is assisted in forcing down the arm $J^2$ of the bell-crank J' $J^2$ by the fixed inclined cam $H^5$, which as the bell-crank travels forward with the tongs D forces up the arm J', and thus lends its aid to depress the arm $J^2$ should the inclined plane $H^4$ have difficulty in doing so. From the above it will be obvious that by adjusting the angles of the inclined cams $H^4 H^5$ relatively to one another, and particularly by adjusting the strength of the spring $J^4$, the speed at which the feed-nozzle $G^2$ is returned may be regulated. A convenient ratio for the relative speeds of opposite movement of the tongs D and feed-nozzle $G^2$ is found to be that of one to four. The rate of discharge of batter may be regulated by the proportions of the cam H and cylinder G. Also the cam H may be so constructed as to vary the speed at which the batter is delivered upon different portions of the plate D. Just before the feed-nozzle $G^2$ reaches the end of the plate D the cam H passes from under the piston-rod $G^3$, which is immediately returned to its normal position by the spring $g^2$, and the discharge of batter ceases. As the tongs continue their forward motion the lid or upper plate D is lowered from the guide-rods $D^3$ and closed down upon the lower plate D and the two plates locked together, as above described. The tongs D are then passed through the oven F and no other mechanical operation takes place until they arrive at the rack $L^4$. As they pass over the rack $L^4$ the knives L are raised and lowered, as hereinbefore described, and the knives by thus passing over the joint of the plates D remove any "scrap" or baked batter which may protrude from between the same. The tongs D in passing the pin $M^4$ are unlocked and the lid or upper plate engaging with the guide-rods $D^3$ is raised upon its hinges $d$. When the tongs arrive at the top of the machine, the baked batter or wafer is removed and the plates pass on toward the feed-nozzle $G^2$. As they pass over the second rack $L^5$ the knives L are again raised, as before described, and remain in this position while the plate D is being charged with batter from the feed-nozzle $G^2$. The batter having had time to spread, the tongs D arrive over the third rack $L^6$, when the knives or blades L are again lowered to their normal position. The lid or upper plate is then lowered and locked as before and the same cycle of operations repeated.

Attention is directed to the double purpose to which the knives or blades L are applied—viz., trimming off the scrap batter and acting as a bead to the lower plate of the tongs D while the same is charged with batter.

In the alternative construction of batter-delivery device illustrated in Figs. 9 to 12 a pump-cylinder is arranged to move to and fro in slides or upon guide-rods and to accompany each pair of tongs for a portion of their travel and then to be quickly returned to the starting-point. Upon the pump-cylinder approaching the end of a forward movement the pump piston and cylinder are caused to move relatively with one another to expel the charge of batter contained in the cylinder. The rearward or return movement of the pump-cylinder along the guide-rods is performed by mechanism hereinafter described, and when approaching the completion of this return movement relative motion between the piston and pump-cylinder again takes place, causing suction, which fills the cylinder with batter from a reservoir. The pump is now ready to perform an outward movement in company with the next pair of tongs to be charged. Upon the extremities of the rear axletrees $D^2$ of the tongs D are mounted projecting pieces $D^5$, with teeth $D^6$ formed upon them, for a purpose hereinafter described. Two brackets G' are secured upon the framing A of the machine, and supported between them are guide-rods $G^4$. The pump-cylinder G may be provided with tubular extensions or attachments G⁷, which slide freely over the guide-rods G⁴. The piston of the pump is secured at a point distant from either end of the piston-rod which passes through both covers of the pump-cylinder G. A stuffing-box G⁸ is provided in that cover which is in contact with the batter. The brackets G′ form stops for the extremities G⁵ G⁶ of the piston-rod to come against and prevent further movement of the piston while the movement of the pump-cylinder G is continued. By this means the pump-cylinder G on nearing the completion of its forward travel will be moved relatively with the piston to effect the ejection of the batter, and upon nearing the completion of the rearward travel the cylinder will again be moved relatively with the piston to effect suction of the batter from a reservoir through the port R. An adjustable screw-stop G⁹ may be employed to vary the piston-stroke. The forward movement of the cylinder G upon the guide-rods is obtained by a projection D⁵ upon one of the axles D² coming into contact with the depending block J upon the cylinder. The depending block J is capable of being moved up and down in a slide J upon the pump-cylinder G by means of pins J³ coming into contact with inclines J², formed upon the said block J. The pins J³ inwardly project from an extension A′ of the framing, which is broken away at J⁴, Fig. 9. The inclines and pins are disposed so that at any moment the upper pair shall not be foul of the lower incline nor the lower pin be foul of the upper incline. A blade-spring may be adapted to bear against the rear of the sliding block, so that after it has been raised by the upper pin it is retained in such raised position by the pressure exerted by the spring in order that it may clear the upper pin and also the projecting piece and teeth upon the return movement of the pump-cylinder. Upon the pump nearing the completion of the return movement the block J is moved down by the engagement of the other pin with the lower incline into the path of the succeeding projection D⁵. The pump-cylinder G requires to be moved rearwardly in a short space of time in order that the upper plate of the tongs D, which is brought down as quickly as possible after the charge of batter has been deposited upon the lower plate, shall not foul the discharge-pipe. To accomplish this, a lever K, pivoted to the frame A, is provided upon its boss K³ with a projection K′ and teeth K², (shown in dotted lines,) which correspond to and are engaged by the projections D⁵ and teeth D⁶ upon the axles D². As the axles move forward a small rotative movement of the boss is obtained, causing the outer end of the lever to move through an arc and to effect, by means of a suitable connecting-rod K⁴, (broken at K⁵, Fig. 9, its continuation and connection at the cylinder being shown in dotted lines,) the quick-return movement of the pump-cylinders. The discharge-pipe G¹⁰, connected at one end to a port in the pump-cylinder, is provided at the other end with a number of branches carrying nozzles G², three only of such branches being shown in Fig. 11. In order to prevent drip after the discharge has taken place, valves G¹¹, which can be hollowed below, as indicated in dotted lines, Fig. 12, may be placed in the nozzles G². The valves (best seen in Fig. 12) have stems G¹², around which are placed spiral springs G¹⁴. When the valves open, the springs G¹⁴ exert pressure between sockets G¹³, supported by webs in the nozzles, and the nuts and washers upon the ends of the stems. The valves by these means are again seated immediately the discharge of batter ceases. Other modes of preventing drip may be employed. The operation of this batter-delivering device is as follows: The pump-cylinder G is moved along the guide-rods G⁴ to the position shown in Fig. 9 by the engagement of one of the projections D⁵ upon the traveling axles with the depending block J. In the position shown in the figure the end of the piston G⁵ has been brought against the bracket-stop G, and the cylinder continuing its travel moves in relation to the piston, which will eject the batter through the discharge-pipe G¹⁰ and nozzles G². The upper incline upon the block J is now brought in contact with the upper pin J³, which raises the block out of engagement with the projection D⁵ on the axle. At this instant the projection K′ upon the lever K is engaged by another of the projections D⁵ and causes rotative movement of the boss K³ of the lever, the movement being continued by the engagement of the teeth D⁴ upon the axle D² with the teeth K² upon the boss of the lever. It will thus be seen that a small movement of the boss K³ causes the end of the lever to move through a large arc. This movement communicated to the cylinder quickly returns it along the guide-rods, so that the plate D, which is being rapidly closed, does not foul the discharge-pipe carried by the cylinder. As the cylinder nears the end of the return movement the end G⁶ of the piston-rod comes against the adjustable stop G⁹, and the cylinder completing its length of travel again moves in relation to the piston, thereby performing the suction-stroke, which draws in from the reservoir through the port R a charge of batter for the next pair of tongs. During the return movement also the descent of the contact-block J is effected by the lower incline coming into contact with the rear pin. The said block J will now be in the path of the succeeding projection D⁵, by which it is to be carried forward.

I claim—

1. In a wafer-making machine the combination of traveling "tongs," a trimming device acting also as a bead carried by the "tongs," means for operating such trimming device, an automatic batter-feeding device, and cams or projections moving with the "tongs" and operating the feeding device.

2. In a wafer-making machine, the combination with traveling "tongs," of an automatic batter-feeding device and cams or projections moving with the "tongs" and operating the feeding device.

3. In a wafer-making machine the combination of traveling "tongs," an automatic batter-feeding device having a reciprocating feed-nozzle, and cams or projections moving with the "tongs" and operating the feeding device.

4. In a wafer-making machine the combination of traveling "tongs," an automatic batter-feeding device having a reciprocating feed-nozzle, a guide for said nozzle, means for returning the nozzle quickly, and cams or projections moving with the "tongs" and operating the feeding device.

5. In a wafer-making machine the combination with traveling "tongs," of an automatic batter-feeding device having a reciprocating nozzle, cams or projections moving with the "tongs" and operating the feeding device, a guide for the nozzle, means for returning the nozzle quickly and an inclined cam-plate $H^4$, second inclined cam $H^5$ and a traveling lever $J'$ $J^2$, controlling and operating the reciprocating nozzle, substantially as set forth.

6. In a wafer-making machine the combination with traveling "tongs," of a trimming device carried by the "tongs" and means for automatically operating such device at certain periods.

7. In a wafer-making machine the combination with traveling "tongs" of a trimming device comprising knives L, levers $L^2$, eccentrics $L'$ and a pinion $L^3$, and racks $L^4$ $L^5$ $L^6$ operating said pinion, substantially as set forth.

In witness whereof I have hereto set my hand in the presence of two subscribing witnesses.

GEORGE SAMUEL BAKER.

Witnesses:
WALTER J. SKERTEN,
GEO. J. W. BURCHLIN.